March 14, 1933. J. W. TAPP 1,901,539
AGRICULTURAL MACHINE
Filed Sept. 12, 1931 2 Sheets-Sheet 1

Inventor
J. W. Tapp
By C. A. Snow & Co.
Attorneys.

March 14, 1933. J. W. TAPP 1,901,539
AGRICULTURAL MACHINE
Filed Sept. 12, 1931 2 Sheets-Sheet 2
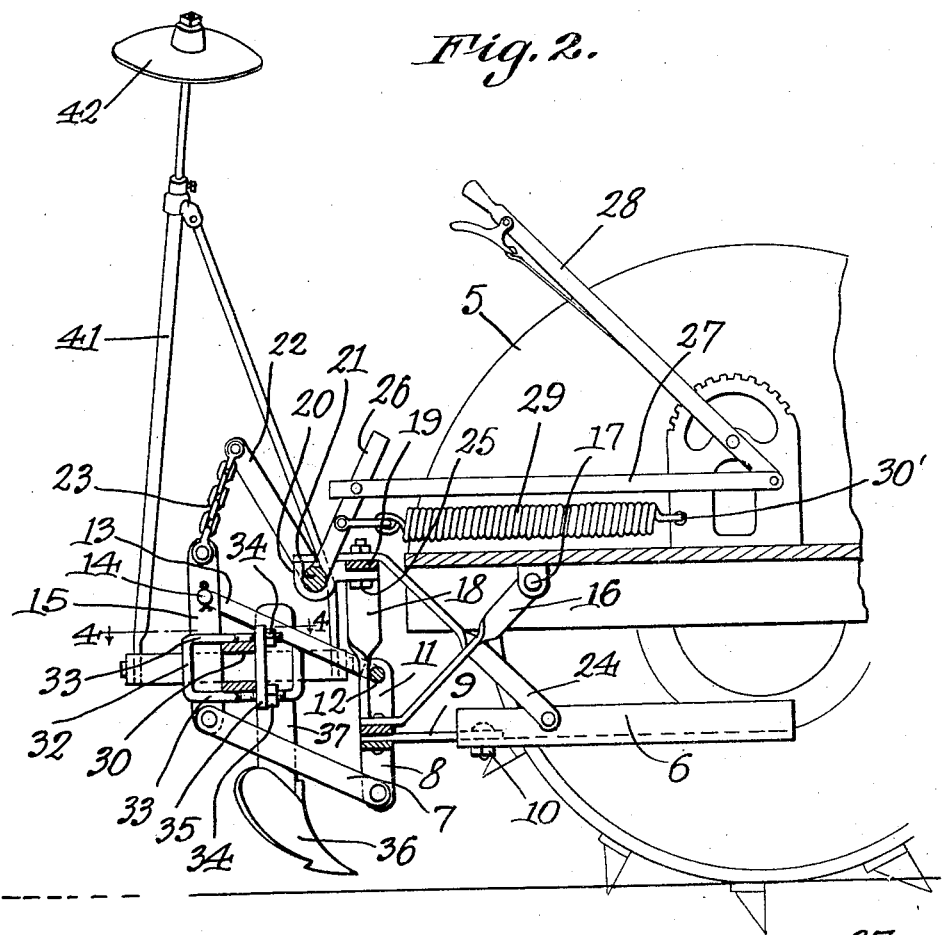
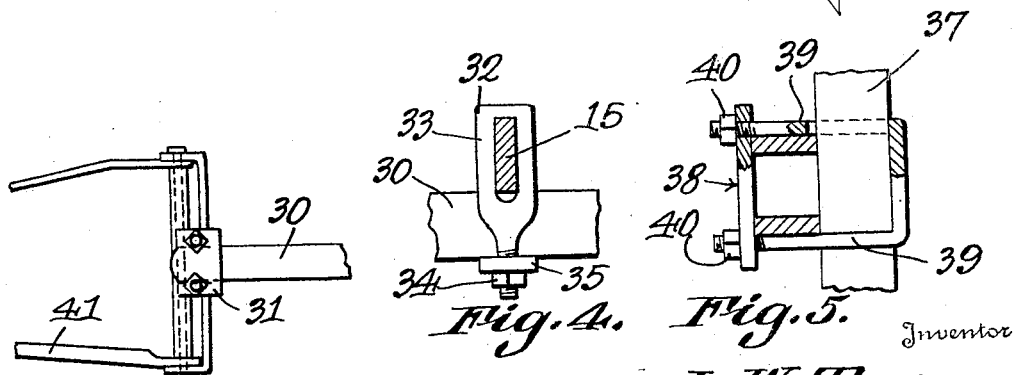
Inventor
J. W. Tapp
By C. A. Snow & Co.
Attorneys.

Patented Mar. 14, 1933

1,901,539

UNITED STATES PATENT OFFICE

JOHN W. TAPP, OF GLENDALE, ARIZONA

AGRICULTURAL MACHINE

Application filed September 12, 1931. Serial No. 562,567.

This invention relates to agricultural machines, and aims to provide a furrowing and bedding tool in the form of an attachment, to be mounted at the rear of a tractor so that it may be readily and easily controlled by the operator of the tractor.

An important object of the invention is to provide an attachment of this character comprising a shovel supporting member, novel means being provided for pivotally mounting the shovel supporting member, so that it may be readily and easily moved vertically at the will of the operator, to regulate the depth of operation of the shovels supported thereby.

A further object of the invention is the provision of means for adjusting the shovels longitudinally of the shovel supporting member, thereby adapting the attachment for use in laying rows of various distances apart.

A still further object of the invention is to provide means for adjusting the normal position of the operating mechanism with respect to the shovel supporting bars, to further regulate the depth of operation of the shovels.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 2 is a sectional view through the attachment and through the rear end of a tractor.

Figure 3 is a plan view illustrating the manner of mounting the marker arms on the attachment.

Figure 4 is a sectional view taken substantially on line 4—4 of Figure 2.

Figure 5 is a sectional view taken substantially on line 5—5 of Figure 1.

Figure 1:
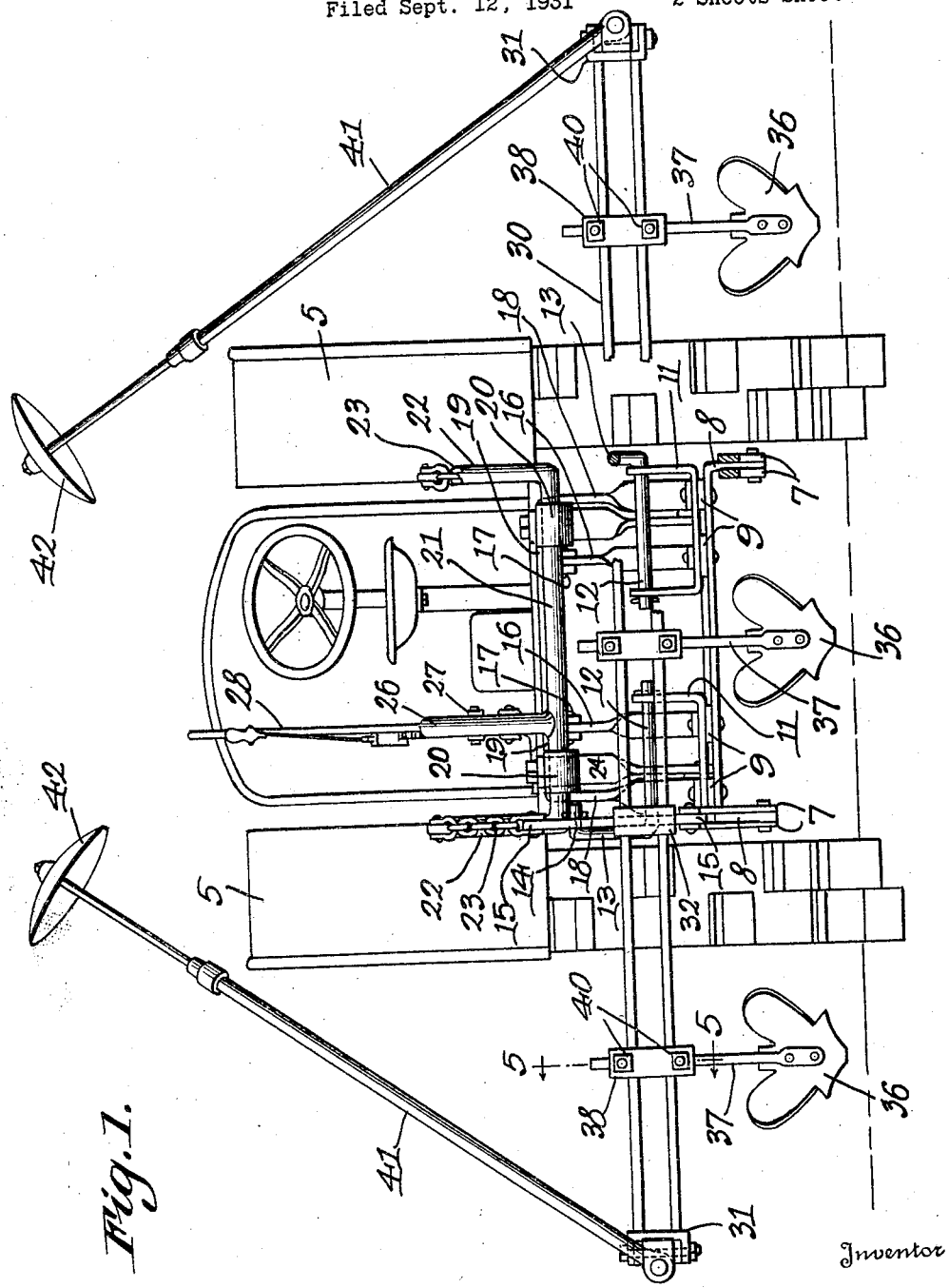
Figure 1 is a rear elevational view of a tractor illustrating an attachment constructed in accordance with the invention, as mounted thereon.

Referring to the drawings in detail, the reference character 5 designates the rear end of a tractor, the rear end of the chassis being indicated by the reference character 6.

The device forming the essence of the present invention includes a pivoted frame embodying end bars 7, that are pivotally connected with the depending brackets 8 that are secured to the bars 9 which are shown as secured to the chassis of the tractor, at 10.

Supported by the bars 9, are upstanding brackets 11 which are formed with openings to accommodate the rods 12 that form a part of the frame. The rods 12 are provided with right angled end portions 13 that have inwardly extended ends 14 disposed within openings of the bars 15, which in turn have their lower ends pivotally connected with the end bars 7.

Thus it will be seen that the bars 7, bars 15, and the rods 13 form the pivoted frame by means of which the shovel supporting bar, to be hereinafter more fully described is supported.

Brace arms indicated at 16 connect with the bars 9 and extend upwardly towards the tractor, where they are secured to the tractor, at 17.

Upstanding arms 18 extend from the bars 9, and have laterally extended end portions 19 to which the bearing members 20 are secured, the bearing members providing a support for the operating rod 21 that has right angled end portions 22.

Chains 23 connect the right angled end portions 22 of the rod 21, to the bars 15 of the pivoted shovel bar supporting frame. Brace arms 24 connect with the frame of the tractor, and extend rearwardly, where they are bolted to the laterally extended end portions 19 of the upstanding arms 18, by means of the bolts 25.

Extending from the operating rod 21, is an arm 26 to which the bar 27 is pivotally connected, the bar 27 being also pivotally connected with the lever 28, so that movement of the lever 28 by the operator, will act to swing the bar 27 and rod 21, to raise or lower the pivoted supporting frame.

A coiled spring 29 connects with the arm 26, the opposite end of the spring being anchored at 30', so that movement of the bar 27 will be restricted by the spring. The shovel supporting member is indicated generally by the reference character 30, and comprises a pair of bars held in spaced relation with each other, and secured at their ends by means of the securing clamps 31.

The shovel supporting bar is connected to the bars 15 or pivoted supporting frame, by means of the clamps 32, which are of novel construction, each clamp embodying a pair of spaced arms 33 which have substantially wide portions formed with elongated openings through which the bars 15 extend, as clearly shown by Figure 4.

These elongated openings are of sufficient lengths to receive the bars 15 and allow slight movement of the bars 15 within the openings, so that the front edges of the bars 15 may be brought into engagement with the rear edges of the bars of the shovel supporting member.

Threads are formed at the free ends of the arms 33 and accommodate the nuts 34, which bear against the plates 35 to draw the bars 15 into close engagement with the shovel supporting member, securing the shovel supporting member in position.

Due to this construction, the shovel supporting member may be adjusted vertically with respect to the pivoted supporting frame, to the end that the normal position of the shovel supporting member may be changed or varied at the will of the operator.

The shovels are indicated by the reference character 36, and each shovel is provided with a supporting arm 37 that extends upwardly therefrom.

Clamps 38 are also mounted on the shovel supporting member, and provide means for connecting the shovels to the supporting member 30. Each of these clamps comprises spaced arms 39 formed with elongated openings to receive the supporting arms 37, which are held into close engagement with the shovel supporting member, by means of the nuts 40 positioned on the threaded ends of the arms 39.

By loosening the nuts 40, the supporting arms 37 of the shovels, may be adjusted vertically with respect to the supporting member. Pivotally mounted at the outer ends of the shovel supporting member are arms 41, that carry marking disks 42 at their free ends.

From the foregoing it will be obvious that due to the construction shown and described, the shovels may be adjusted vertically while in operation, to vary the depth of operation of the shoulders, or to move the shovels, to clear stumps, rocks or other stationary objects in the field over which the machine is moved.

Having thus described the invention what I claim is:

The combination with a tractor, of a shovel support comprising a frame embodying a pair of horizontal spaced bars, depending brackets and upstanding brackets, secured to the tractor frame, pivoted bars connected with the depending brackets, rods connected to the upstanding brackets, vertical bars to which the pivoted bars and rods are connected, clamps having elongated openings to accommodate the vertical bars and embrace the horizontal bars, securing the horizontal bars to the tractor, means for securing shovels to the shovel supporting frame, and means connected with the vertical bars for moving the frame vertically to adjust the depth of operation of the shovels.

In testimony that I claim the foregoing as my own, I have hereto affixed my signature.

JOHN W. TAPP.